United States Patent
Yokota

(10) Patent No.: US 10,521,894 B2
(45) Date of Patent: Dec. 31, 2019

(54) APPARATUS FOR PRESENTING SUPPORT IMAGES TO A DRIVER AND METHOD THEREOF

(71) Applicant: DENSO CORPORATION, Kariya, Aichi-pref. (JP)

(72) Inventor: Nobuyuki Yokota, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 15/749,634

(22) PCT Filed: Jul. 21, 2016

(86) PCT No.: PCT/JP2016/071371
§ 371 (c)(1),
(2) Date: Feb. 1, 2018

(87) PCT Pub. No.: WO2017/022497
PCT Pub. Date: Feb. 9, 2017

(65) Prior Publication Data
US 2018/0225813 A1  Aug. 9, 2018

(30) Foreign Application Priority Data
Aug. 4, 2015 (JP) ................................. 2015-154408

(51) Int. Cl.
*G06T 5/50* (2006.01)
*B60R 1/00* (2006.01)
(Continued)

(52) U.S. Cl.
CPC .................. *G06T 5/50* (2013.01); *B60R 1/00* (2013.01); *B60W 50/14* (2013.01);
(Continued)

(58) Field of Classification Search
CPC ....... G06T 5/50; G06T 11/00; G06K 9/00791; B60W 50/14; H04N 7/181
See application file for complete search history.

(56) References Cited

U.S. PATENT DOCUMENTS

| 9,749,648 B2* | 8/2017 | Otsuka ................. H04N 19/436 |
| 2005/0169555 A1* | 8/2005 | Hasegawa ............ H04N 1/3876 382/284 |
| 2012/0069153 A1* | 3/2012 | Mochizuki ................ B60R 1/00 348/47 |
| 2012/0250996 A1* | 10/2012 | Watanuki ................. H04N 1/62 382/167 |

(Continued)

FOREIGN PATENT DOCUMENTS

| JP | 2007-041791 A | 2/2007 |
| JP | 2007-274377 A | 10/2007 |

(Continued)

*Primary Examiner* — Ming Y Hon
(74) *Attorney, Agent, or Firm* — Knobbe, Martens, Olson & Bear, LLP

(57) ABSTRACT

An image recognition unit recognizes an object in each image captured by a plurality of imaging devices each imaging a partial overlapped imaging region surrounding a vehicle. An image synthesis unit generates a synthesized image by partially overlapping and joining converted images viewed from preset virtual viewpoints, when an imaging region including the recognized object is an overlapping region of which any one of two imaging devices performs imaging. The image synthesis unit synthesizes each converted image area in the overlapping image regions, using a preset blend ratio when an image of the converted images which are joined to partially overlap is generated. An image-setting unit sets the blend ratio of each converted image in the overlapping image regions for recognition results of an object, and a driving support image synthesized with the set blend ratio is output to a display apparatus.

11 Claims, 9 Drawing Sheets

(51) Int. Cl.
*H04N 7/18* (2006.01)
*G06K 9/00* (2006.01)
*G08G 1/0962* (2006.01)
*B60W 50/14* (2012.01)
*G06T 11/00* (2006.01)

(52) U.S. Cl.
CPC ..... *G06K 9/00791* (2013.01); *G06K 9/00805* (2013.01); *G06T 11/00* (2013.01); *G08G 1/0962* (2013.01); *H04N 7/18* (2013.01); *H04N 7/181* (2013.01); *B60R 2300/105* (2013.01); *B60R 2300/303* (2013.01); *B60R 2300/307* (2013.01); *B60R 2300/602* (2013.01); *B60R 2300/802* (2013.01); *B60R 2300/8093* (2013.01); *B60W 2050/146* (2013.01); *G06T 2207/20221* (2013.01)

(56) References Cited

U.S. PATENT DOCUMENTS

| 2013/0286205 A1* | 10/2013 | Okada | H04N 7/18 348/148 |
| 2014/0112597 A1* | 4/2014 | Yu | H04N 7/18 382/294 |
| 2014/0152774 A1* | 6/2014 | Wakabayashi | G08G 1/168 348/46 |
| 2015/0281594 A1* | 10/2015 | Sakaniwa | H04N 7/181 348/218.1 |

FOREIGN PATENT DOCUMENTS

| JP | 2012-253428 | 12/2012 |
| JP | 2014-086076 | 5/2014 |
| JP | 2014-090349 A | 5/2014 |
| JP | 2015-015527 | 1/2015 |

\* cited by examiner

FIG.4

(A) BASIC CORRESPNDENCE TABLE

| CAMERA | FRONT SIDE | REAR SIDE | RIGHT SIDE | LEFT SIDE |
|---|---|---|---|---|
| VIRTUAL VIEWPOINT | E1 | E2 | E3 | E4 |

(B) SUPPLEMENT CORRESPNDENCE TABLE

| CAMERA | FRONT SIDE | REAR SIDE | RIGHT SIDE | LEFT SIDE |
|---|---|---|---|---|
| VIRTUAL VIEWPOINT | E5 | E6 | E7 | E8 |

FIG.10
(A) REAR-SIDE CAMERA
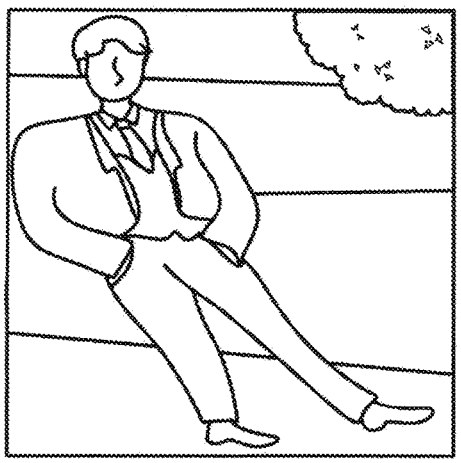
(B) RIGHT-SIDE CAMERA
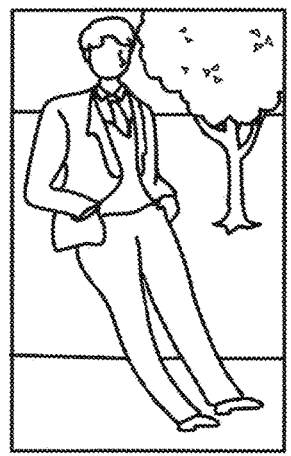
(C) BLEND RATE 50%
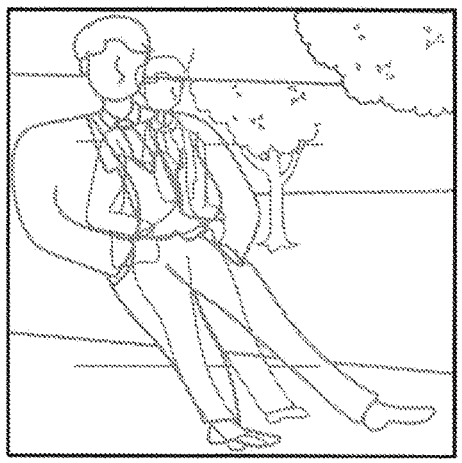
(D) BLEND RATE: REAR 70%: RIGHT 30%
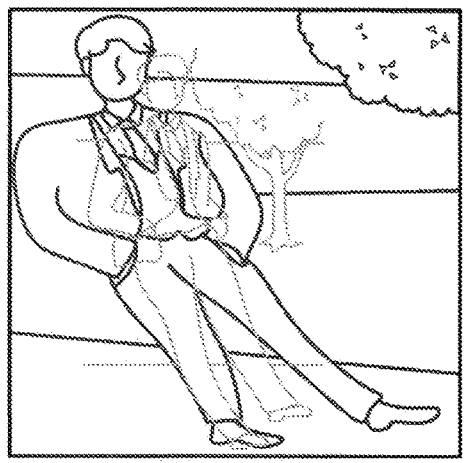

APPARATUS FOR PRESENTING SUPPORT IMAGES TO A DRIVER AND METHOD THEREOF

This application is based on and claims the benefit of priority from earlier Japanese Patent Application No. 2015-154408 filed on Aug. 4, 2015, the description of which is incorporated herein by reference.

TECHNICAL FIELD

The present invention relates to display control technique for providing driving support images to a driver of a vehicle, and more particularly, relates to a display control technique which provides driving support images to a driver, based on image data obtained from a plurality of imaging devices, each imaging device capturing images in each region which overlaps in part with another region surrounding the vehicle in which the imaging devices are mounted.

RELATED ART

Conventionally there is a known technique of controlling on vehicle display, by imaging each imaging region, which is partially overlapped surrounding a vehicle, using a plurality of cameras mounted on the vehicle. Joining converted images of the plurality of images captured generates a single display image, and the display image is output to the on-vehicle display as a driving support image.

For example, after the plurality of captured images is converted into a bird's eye view image by joining the images, a single bird's eye view display image is generated. At this point, there are however cases of an object being detected in an imaging region corresponding to the joined section of the bird's eye view display image. In such a case, a technique described in JP2007-41791A proposes a technique of changing a position of an image boundary line which is the joining section of the bird's eye display image.

CITATION LIST

Patent Literature

[Patent Literature 1] JP2007-41791A

Technical Problem

However, according to conventional techniques, by displaying the joined section of the image as the boundary line in the driving support image, a problem of displaying unnatural, for example, distorted driving support images to a driver may arise.

In this regard, it is considered that the problem of such unnatural appearance of the display image may be resolved by joining two converted images to synthesize an overlapping image region. However, when an object exists in an overlapping image area of a synthesized image, deterioration of visibility of the object is also considered to be potentially troublesome for the driver.

SUMMARY

In view of the above issues, the present disclosure aims to provide a display control technique which resolves unnatural appearance of joined sections of a displayed image, by synthesis of image region areas which overlap each converted image, and suppresses deterioration of the visibility of an object in the overlapping image region areas.

An aspect of the disclosure is a display control apparatus installed in a vehicle. The display control apparatus is provided with an image recognition unit, an image synthesis unit, an image-setting unit and an image-outputting unit. The image recognition unit recognizes predetermined objects from images captured by a plurality of imaging devices mounted on the vehicle in order to capture images in each partially overlapped imaging region surrounding the vehicle.

An imaging region which has an object recognized by the imaging recognition unit included in the region may be an overlapping region in which both of two imaging devices are operable to capture images. In this case, the image synthesis unit converts each captured image of the two imaging devices to images which are each viewed from a preset virtual viewpoint, and generates an adjoined synthesized image by partial overlapping of each converted image. The image synthesis unit synthesizes each converted image area in the overlapping image regions using a preset blend ratio, when the synthetic image is synthesized by joining each of the converted images to provide partially overlapped sections. That is, the overlapping image regions are regions in which each converted image is overlapped to fit with another converted image.

The image-setting unit sets the blend ratio of each converted image areas in the overlapping image regions based on recognition results from the image recognition unit. In this way, each of the converted images areas in the overlapping image regions is synthesized by the image synthesis unit using a blend ratio set by the image-setting unit. The synthesized image is output from the image-outputting unit to a display apparatus installed in the vehicle as a driving support image.

According to this configuration, the converted image areas in the overlapping image regions are synthesized by joining to partially overlap each of the converted images and the converted image areas are synthesized using a set blend ratio based on the recognition results of an object. Furthermore, an image may be presented without enhancing the joined sections and clearer presentation of an object in overlapping image region areas, which include a joined section, may be thus achieved.

According to the present disclosure, unnatural appearance, such as distortion of a joined section is resolved by synthesis of the overlapping image region areas, and visual deterioration of an object in the overlapping image region areas may also be suppressed.

Also, the same effect as the display control apparatus mounted in a vehicle as the foregoing aspect of the disclosure may be also obtained with a display control method according to another aspect of the disclosure, for the same reasons mentioned hereinabove.

It is to be understood that symbols in the summary and claims are used to show a corresponding relation between specific means as a mode described in preferred embodiments, and do not limit a technical range of the present disclosure.

BRIEF DESCRIPTION OF DRAWINGS

In the accompanying drawings:

FIG. 4 is a descriptive diagram, which includes a basic correspondence table (same figure (A)) and a supplementary correspondence table (same figure (B));

FIG. 10 is a descriptive diagram including an image of a viewpoint converted image area of an object based on captured image of a rear camera (same figure (A)), an exemplified image of the viewpoint converted image area of the object based on the captured image of a right-side camera (same figure (B)), an exemplified image of an overlapping image area of both viewpoint converted image areas synthesized at a 50% blend ratio (same figure (C)), and an exemplified image of the overlapping image area of the both viewpoint converted image areas synthesized at a blend ratio of 70%:30% (same figure (D)).

EMBODIMENTS OF DISCLOSURE

Embodiments of the present disclosure will now be described with reference to figures.

[First Embodiment]

A display control apparatus 1 mounted in a vehicle is provided with a plurality of cameras 10, a display control unit 20 and a display 30. Although not shown in the figures, the display control apparatus 1 mounted in a vehicle is connected to an in-vehicle Local Area Net Work (referred to as an in-vehicle LAN hereon). The LAN is configured to share vehicle related information, for example, information detected from each type of sensor between other Electronic Control Units (referred to as ECU hereon) which are connected to the in-vehicle LAN.

A vehicle in which configuring elements are mounted is referred to as a host vehicle. It is to be understood that the display control unit 20 in the first embodiment is a processing device which processes image data captured by the plurality of cameras 10 (described in detail hereinafter).

It is noted that the in-vehicle LAN is a Local Area Network deployed inside the host vehicle. The LAN uses a communication protocol, such as, CAN (Controller Area Network), FlexRay, LIN (Local Interconnect Net Work), MOST (Motor Oriented Systems Transport Network), ACV-LAN (Audio and Video Communication LAN), for example, to transmit each type of vehicle related information. In the first embodiment, information showing a driving direction of the host vehicle (for example, shift-lever position, steering direction, and other manipulated variables, such as, an accelerator pedal variable) are transmitted from other ECU to the display control apparatus 1, mounted in the vehicle, as vehicle related information.

Figure 1:
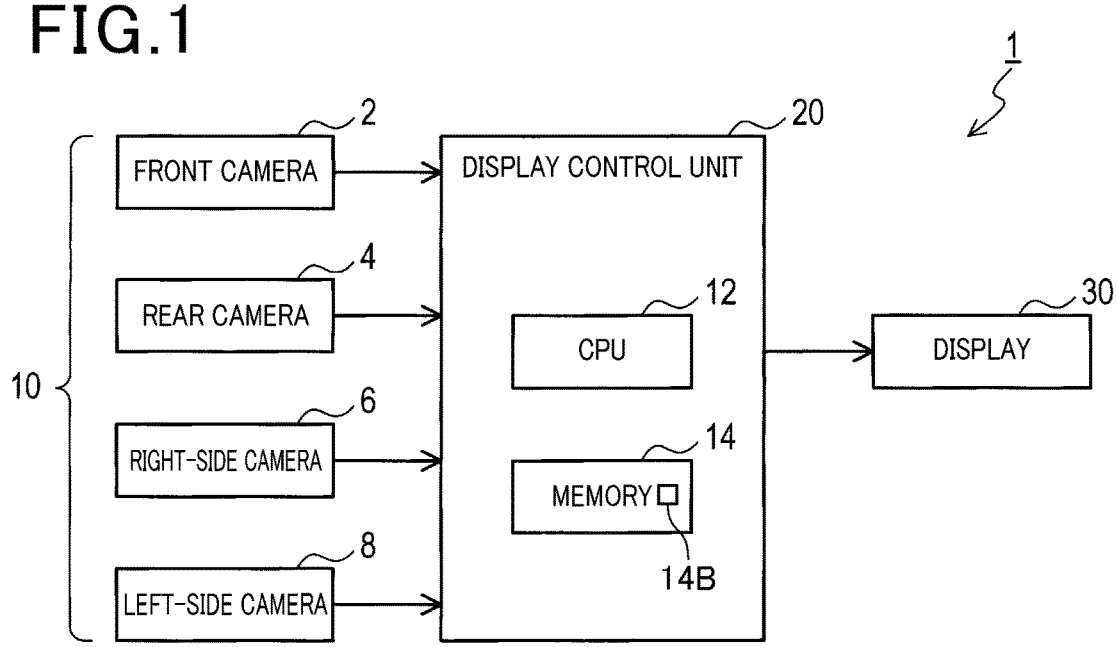
FIG. 1 is a block diagram showing a configuration of a display control apparatus mounted in a vehicle according to an embodiment.
Figure 2:
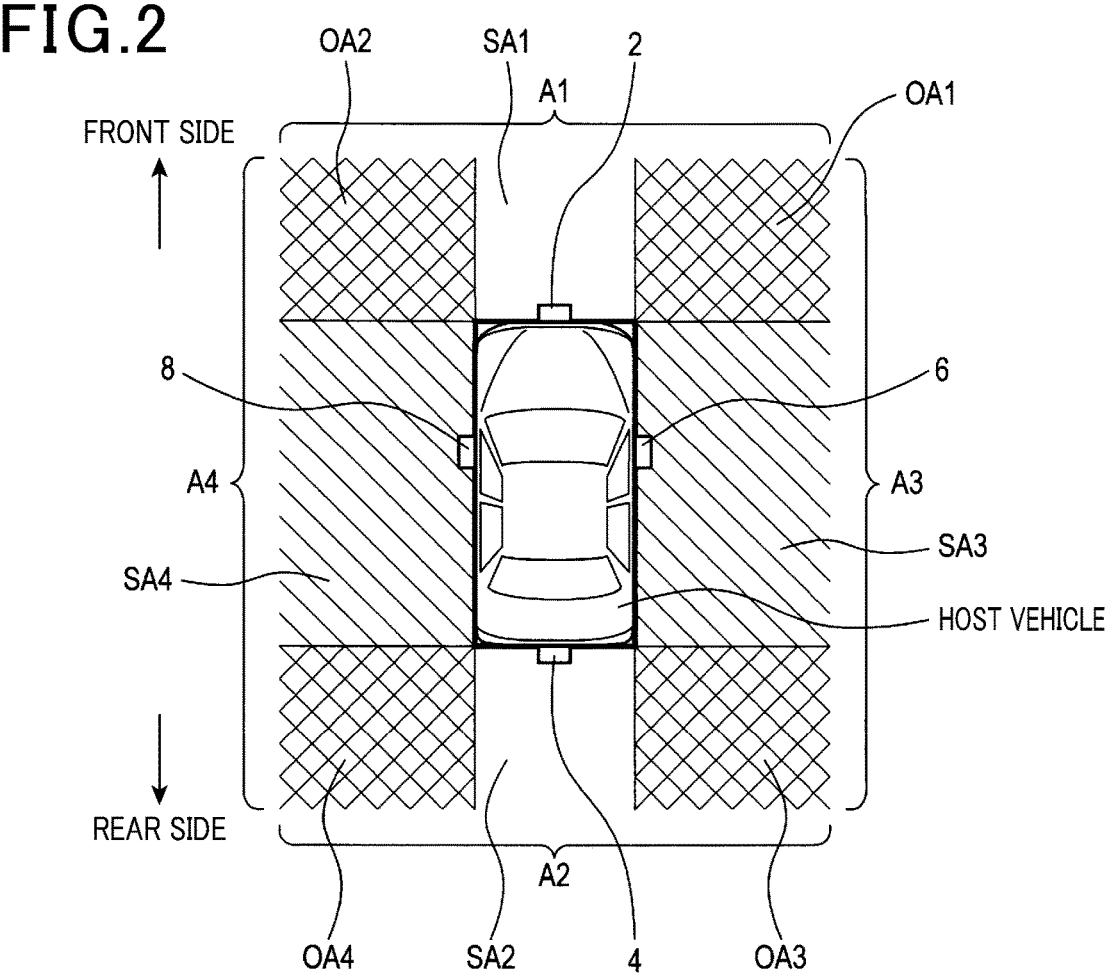
FIG. 2 is a descriptive drawing showing each imaging region of a plurality of cameras mounted on a host vehicle according to the embodiment.
Figure 3:
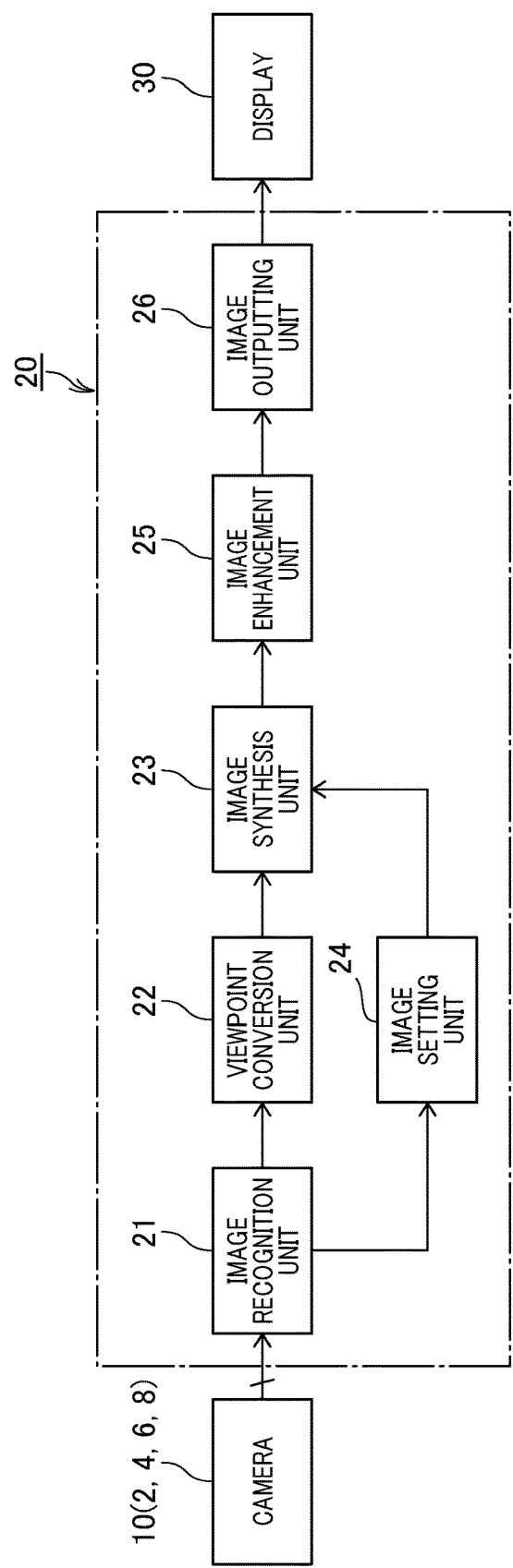
FIG. 3 is a block diagram showing a functional configuration of a display control unit according to the embodiment.

The cameras 10 are a plurality of imaging devices mounted on the host vehicle used for imaging the surrounding of the host vehicle. More specifically, each camera 10 is mounted on a respective front, rear, left, and right position of the host vehicle. In the first embodiment, each camera 10 is broadly classified as a front camera 2, a rear camera 4, a right-side camera 6 and a left-side camera 8, according to the mounted position and imaging region of each camera mounted on the host vehicle. As shown in FIG. 2, the front camera 2 is mounted on a front section of the host vehicle (for example, in a center of the front section) and images a front region A1 of the host vehicle. It is noted that the rear camera 4 is mounted on a rear section of the host vehicle (for example, in a center of the rear section) and images a rear region A2 of the host vehicle. The right-side camera 6 is mounted on a right-side section of the host vehicle (for example, a right-side back mirror-section) and images a right-side region A3 of the host vehicle. The left-side camera 8 is mounted on a left-side section of the host vehicle (for example, a left side back mirror section) and images a left-side region A4 of the host vehicle.

Each camera 10 is mounted on the host vehicle so that a part of each imaging region is overlapped with a part of an imaging region of at least one different camera 10 (referred to as overlapping region hereon in the specification of the present disclosure). For example, as shown in FIG. 2, the front region A1 which is the imaging region of the front camera 2, includes a front-right overlapping region OA1 and a front-left overlapping region OA2. The front-right overlapping region OA1 specifically overlaps with a part of the right-side region A3 which is the imaging region of the right-side camera 6, and the front-left overlapping region OA2 specifically overlaps with a part of the left-side region A4 which is the imaging region of the left-side camera 8. In the same way, the rear region A2 which is the imaging region of the rear camera 4, includes a rear-right overlapping region OA3 and a rear-left overlapping area OA4. The rear-right overlapping region OA3 specifically overlaps with a part of the right-side region A3 which is an imaging region of the right-side camera A6, and the rear-left overlapping area OA4 specifically overlaps with a part of the left side region A4 which is an imaging area of the left-side camera 8. That is, the overlapping regions are regions in which any one of the two cameras 10 is operable to capture images.

As shown in FIG. 2, in the front region A1, a region other than the front-right overlapping region OA1 and the front-left overlapping region OA2 is referred to as a front single region SA1. In the rear region A2, a region other than the rear-right overlapping region OA3 and the rear-left overlapping region OA4 is referred to as a rear single region SA2. In the same manner, in the right-side region A3, a region other than the front-right overlapping region OA1 and the rear-right overlapping region OA3 is referred to as a right-side single region SA3. In the left side region A4, a region other than the front-left overlapping region OA2 and the rear-left overlapping region OA4 is referred to as a left-side single region SA4. That is, imaging in the front region A1 which can be performed only by the front camera 2 is referred to as the front single region SA1, and imaging in the rear region A2 which can be performed only by the rear camera is referred to as the rear single region SA2. Furthermore, imaging on the right-side region A3 which can be performed only by the right-side camera 6 is referred to as the right-side single region SA3, and imaging on the left-side region A4 which can be performed only by the left-side camera 8 is referred to as the left side single region SA4.

The display 30 is installed in the host vehicle, for example, as a display apparatus. For example, the display 30 is configured of a liquid crystal display, a head-up display or both of the mentioned displays combined, and mounted in a position which is easily seen by the driver of the host vehicle.

The display control unit 20, that is, a processing device is mainly configured of a known micro-computer and an in-vehicle LAN communication controller. The micro-computer is provided with a CPU 12 (Central Processing Unit), and a RAM 14A (Random Access Memory), a ROM 14B (Read Only Memory) and a semi-conductor memory 14C such as a flash memory. The respective RAM 14A, ROM 14B and semiconductor memory 14C will be simply referred to as 'memory 14' hereon. The CPU 12 executes each type of process, on the basis of a digital computer program stored in the memory 14. Specifically, this program executes a method corresponding to a display control program, for example.

It is to be understood that one micro-computer or a plurality of micro-computers may be provided in the display control unit 20, each mounting place of the single or plurality of micro-computers may be provided anywhere inside the host vehicle. It is also noted that the ROM 14B of the memory 14 functions as a non-transitory storage media.

The display control unit 20 is functionally provided with an image recognition unit 21, a viewpoint conversion unit 22, an image synthesis unit 23, an image-setting unit 24, an image enhancement unit 25 and an image-outputting unit 26, which is functionally actualized by execution of each type of process performed by the CPU 12. The display control unit 20 may also be configured hardware to execute these functions in part or entirely using one or a plurality of electronic circuits, for example, logic circuits or IC circuits.

The image recognition unit 21 is provided with a function to recognize predetermined objects in each image. The object is a pedestrian or another vehicle, for example. It is considered that the driver of the host vehicle is desirably informed of the presence of the object, in view of driving support. Recognition of an object includes a process in which calculation of a candidate value indicating a probability of the object as a candidate object, (a value which indicates a recognition probability of the object) and a movement value indicating the speed of the candidate object, for example, is performed by detection and tracing the candidate object.

The detection of the candidate object, for example, entails detection of a part of an object, which satisfies a featured element predetermined for each object in an image. A featured quantity indicating a qualitative and quantitative level of the featured element to a degree of the detected candidate object is stored in the memory 14. Tracing of the candidate object is performed, for example, by using a plurality of images continuously captured along a time series, to obtain an optical flow value illustrated as a vector of movement of the candidate object in the continuously captured images, whereby the optical flow value is stored as the movement value of the candidate object in the memory 14. Specifically, the candidate object is recognized as the object when predetermined conditions based on the information are satisfied. It is noted that, a recognition method of an object is a method known to person in the field, therefore a detailed explanation is omitted.

Identifying information which identifies a captured image which includes a recognized object, from other captured images, and information of an image position which indicates a position related to the recognized object in an image, for example, are stored in the memory 14. It is noted that the image position information includes information specifying any one of the single regions SA1 to SA4 and overlapping regions OA1 to OA4 as an imaging region, which includes an object recognized by the image recognition unit.

The viewpoint conversion unit 22 specifies one or a plurality of cameras 10 which capture images having a recognized object, recognized by the image recognition unit, as an image recognition device (also referred to as recognition camera hereon). The viewpoint conversion unit 22 is provided with a function of converting a captured image to a viewpoint image, viewed from a virtual viewpoint, which is pre-designated for the recognition camera. It is noted that a process which actualizes a function of specification of the recognition camera, and setting the virtual viewpoint, will be described herein after. The viewpoint conversion unit 22 according to the first embodiment, converts captures images from all of the cameras 10 as candidate viewpoint converted images, and each viewpoint converted image is then supplied to the image synthesis unit 23.

The viewpoint converted image may also be referred to as a coordinate conversion image. The coordinate conversion image is a captured image viewed from a viewpoint of the camera 10 which has coordinates converted to the virtual camera viewpoint. For example, if an optical axis of a camera coordinate is taken as a reference, coordinate positions of all points on an image is calculated by an angle and distance of the points from the optical axis, hence the viewpoint conversion of the image may be performed by rotation and translation of the coordinate positions on the basis of the optical axis of the virtual camera. Specifically, if the position and direction of the virtual viewpoint is set as the optical axis of the virtual camera, a desired viewpoint converted image may be obtained.

It is noted, since viewpoint conversion techniques of images are known techniques a detailed description is omitted.

A correspondence table, which is pre-stored in the memory 14, is used to set a position and direction of the virtual viewpoints. This table is divided into a basic correspondence table and a supplementary correspondence table. The basic correspondence table provides each camera 10 and the relative virtual viewpoint in a one to one correspondence, as exemplified in FIG. 4(A). The basic correspondence table thus enables unambiguous setting of the virtual viewpoint when one of the cameras 10 is specified as the recognition camera.

Figure 5:
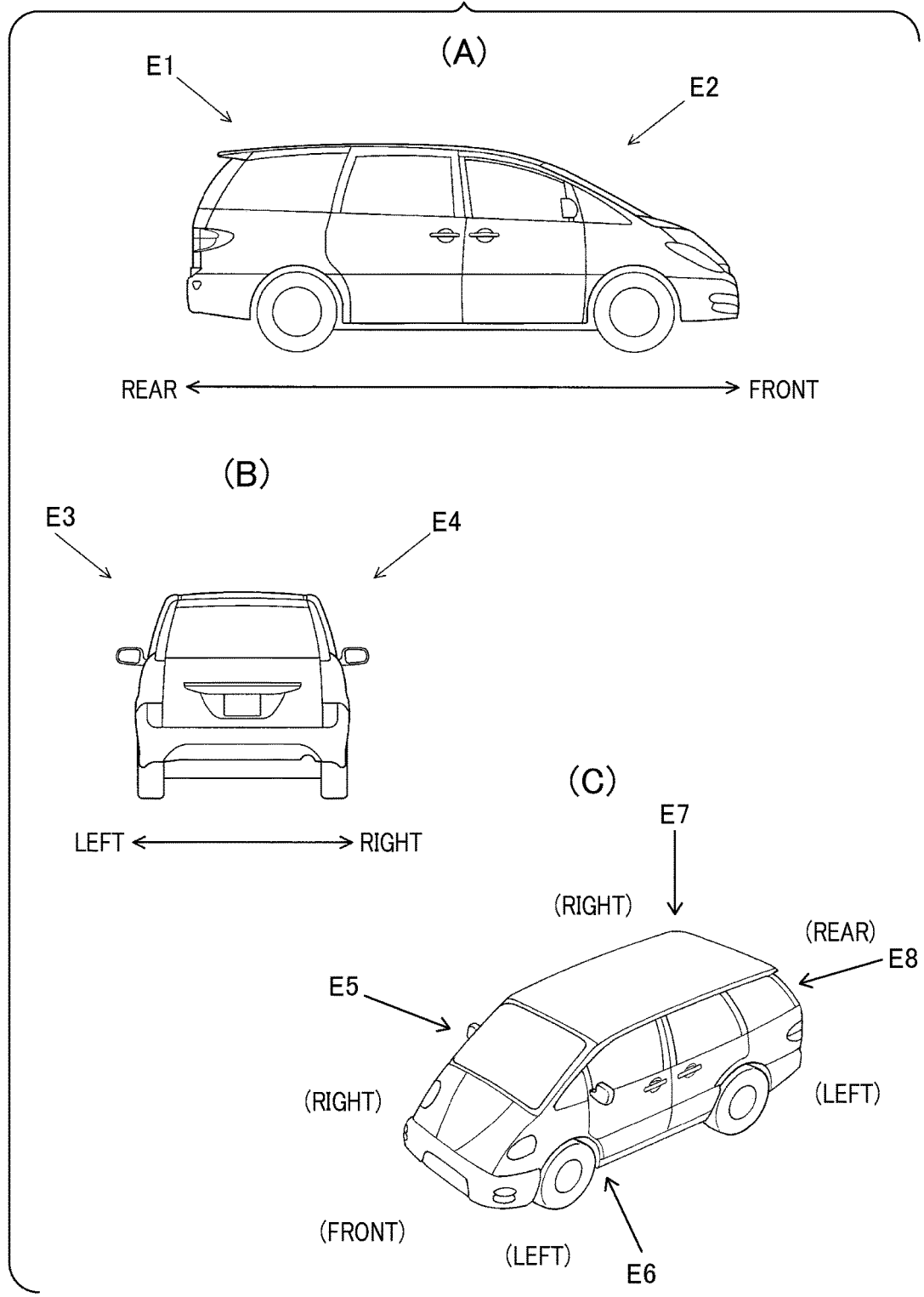
FIG. 5 is a descriptive diagram which includes description of a virtual viewpoint in a front and rear direction of the host vehicle (same figure (A)), a description of the virtual viewpoint in a left-right direction of the host vehicle (same figure (B)), and a descriptive diagram of the virtual viewpoint in an oblique direction of the host vehicle (same figure (C))

In contrast, as shown in FIG. 4(B), the supplementary table provides one to one correspondence of each combination of the cameras 10 and a virtual viewpoint. For example, the cameras 10 have four combination patterns which include; a combination of the front camera 2 and the right-side camera 6 (refer to FIG. 5(C), virtual viewpoint E5), a combination of the front camera 2 and the left-side camera 8 (refer to FIG. 5 (C), virtual viewpoint E6), a combination of the rear camera 4 and the right-side camera 6 (refer to FIG. 5 (C), and virtual viewpoint E7), and a combination of the rear camera 4 and the left-side camera 8, (refer to FIG. 5 (C) and virtual viewpoint E8). That is, the supplementary table enables unambiguous setting of the virtual viewpoint for the specified camera 10 as the recognition camera in any one of the combination patterns mentioned above. It is noted that each one of the four combinations is the same as the two cameras 10 used to describe the overlapping regions.

Specifically, when only the front camera 2 is specified as the recognition device, the virtual viewpoint E1 is set using the basic correspondence table. The virtual viewpoint E1 is a predetermined angle from a point at the rear-side, obliquely above the host vehicle, to the front-side obliquely towards a low part thereof, which includes the host vehicle (refer to FIG. 5 (A)). In a case of when only the rear camera 4 is specified as the recognition device, the virtual viewpoint E2 is set as a predetermined angle, from a point at the front-side, obliquely above the host vehicle to the rear-side obliquely towards a lower part thereof which includes the host vehicle (refer to FIG. 5 (A)).

In the same way, if the specified camera 10 is only the right-side camera 6, the virtual viewpoint E3 is set as a predetermined angle from a point on left-side obliquely above the host vehicle to the right side obliquely towards a lower part thereof which includes the vehicle. Additionally, if only the left-side camera 8 is specified as the recognition device, the virtual viewpoint E4 is set as an angle from a point on the right side, obliquely above the host vehicle to the left-side, obliquely towards a lower part, which includes the vehicle (refer to FIG. 5 (B)).

Also setting of virtual viewpoint using the supplementary table conforms to the setting of the virtual viewpoint using the basic correspondence table. That is, by setting of the viewpoints using the correspondence tables, specifically the basic correspondence table and the supplementary correspondence table, the virtual viewpoints E5 to E8 are each set as the predetermined angles from a position obliquely above the recognition camera on opposed-side thereof, obliquely towards a lower part of the recognition camera-side.

It is to be understood that a direction of the virtual viewpoint is pre-set as a predetermined angle within a range that does not satisfy a right angle (that is, a perpendicular direction) (for example, between 0 to 80°) in at least a vehicle height direction of the host vehicle. The reason for such angle settings is that if a viewpoint converted image is produced as a bird's-eye view image with the virtual viewpoint provided in a perpendicular direction (that is 90°), the tendency of the object in the image stretching in a vertical direction thereof as the object moves away from a center of the image is profoundly increased. In contrast, if the direction of the virtual viewpoint is a flat direction (that is 0°), a blind spot region size caused by the host vehicle in the image is maximized. Hence, in the first embodiment, a set angle related to the direction of the virtual viewpoint is within an angle range in which a perpendicular direction or flat direction of the host vehicle is not met (for example, a range between 10 to 80°).

The image synthesis unit 23 is provided with a function of generating a synthesized image. The synthesized image is generated using each viewpoint image supplied from the viewpoint conversion unit 22 joined together to partially overlap. In the first embodiment, a region which includes a joined section in the synthesized image is an overlapping image region. Specifically, an overlapping image region which is the viewpoint converted images of the respective front camera 2 and the right-side camera partial overlapped, and an overlapping image region which is the viewpoint converted images of the respective front camera 2 and the left-side camera 8 partially overlapped are each formed. Additionally, an overlapping image region which is the viewpoint converted images of the respective rear camera 4 and the right-side camera 6 partially overlapped, and an overlapping region of the viewpoint converted images of the respective rear camera 4 and the left-side camera 8 partially overlapping are each formed. The overlapping regions described above are thus the regions which include the joined sections of the viewpoint converted images in the synthesized image. It is to be understood that each overlapping region corresponds to the overlapping regions OA1 to OA4 (refer to FIG. 2) of the imaging regions of each camera 10.

The image synthesis unit 23 is provided with the function of synthesizing each viewpoint converted image of the overlapping image region using a preset blend ratio (percentage), when the synthesized image is generated. The reason for this is by synthesizing each viewpoint converted image of the overlapping image region included in the joined section of the synthesized image, the joined sections become less obvious in the synthesized image, hence, unnatural appearance, for example, distortion of the joined sections can be reduced.

Figure 6:
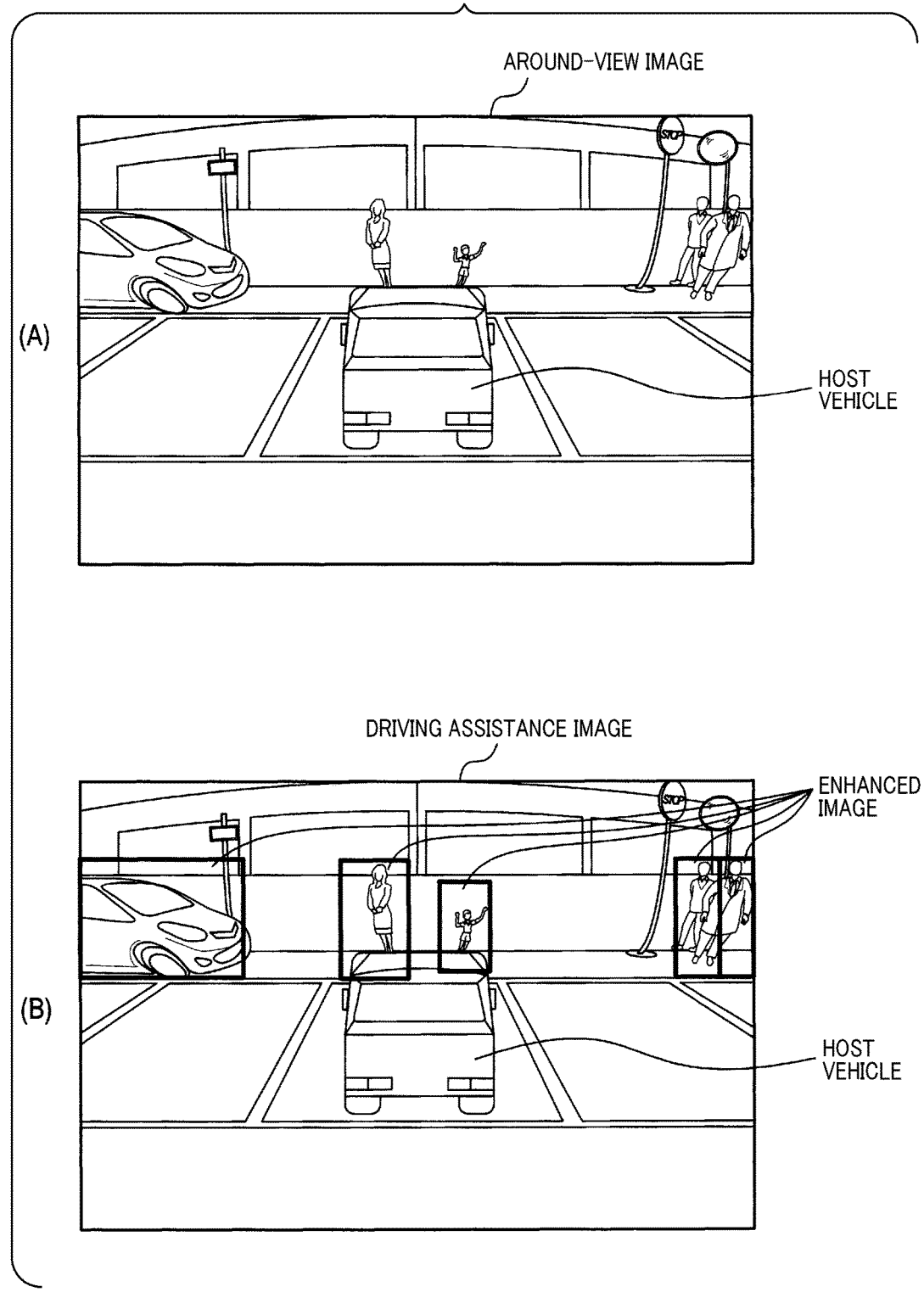
FIG. 6 includes an image showing a synthesized image (same figure (A)), and an image showing a driving support image with an enhanced image added thereto same figure (B))

It is noted that, in the first embodiment, since a synthesized image is formed having the entire viewpoint images of each camera 10 joined by partial overlapping, an around view image with decrease distortion may be produced. The around view image, as shown in FIG. 6 (A) is an image which can display an entire surrounding area of the host vehicle in addition to the host vehicle itself.

The image-setting unit 24 is provided with a function of setting the blend ratio (percentage) of each viewpoint converted image (also referred to as an overlapping image region area hereon) of the overlapping image regions, on the basis of recognition result of an object, recognized by the image recognition unit. The blend ratio set by the image-setting unit 24 is used for the synthesis of the overlapping image region areas performed by the image synthesis unit 23. It is to be understood that a process, which actualizes a function of the image-setting unit 24 (referred to as a blend ratio setting process hereon) will be described in detail hereinafter.

The image enhancement unit 25 is provided with function of visually enhancing an image area of an object (referred to as an object image area hereon) included in the viewpoint converted image converted by the viewpoint conversion unit 22. Specifically, in the first embodiment, a process to visually enhance the object image area of the synthesized image generated at the image synthesis unit 23 is performed. The process is actualized by specifying an image position of the object, on the basis of the image position information stored in the memory 14. Regarding the visual enhancement of an object image area, an image surrounding an object, or an enhanced image which visually enhances an object in the image, for example may be added to the synthesized image. A process in which brightness of the object image area may be increased to be higher than other surrounding image areas, or a contrast of at least one of the object image area and the synthesized image may also be changed.

The image-outputting unit 26 is provided with a function of outputting a synthesized image, which is synthesized by the overlapping image region areas using the image synthesis unit 23. The synthesized image has a blend ratio set at the image-setting unit 24 and is output to the display 30 as the driving support image. Specifically, according to the first embodiment, the around view image having the object image area visually enhanced by the image enhancement unit 25 is output to the display 30. The driving support image is a display image which notifies the driver of an existing object, for example, another vehicle or a pedestrian, hence the driving support image is a displayed image which assists driving of the host vehicle.

[Process]
[Virtual Viewpoint Setting Process]

Figure 7:
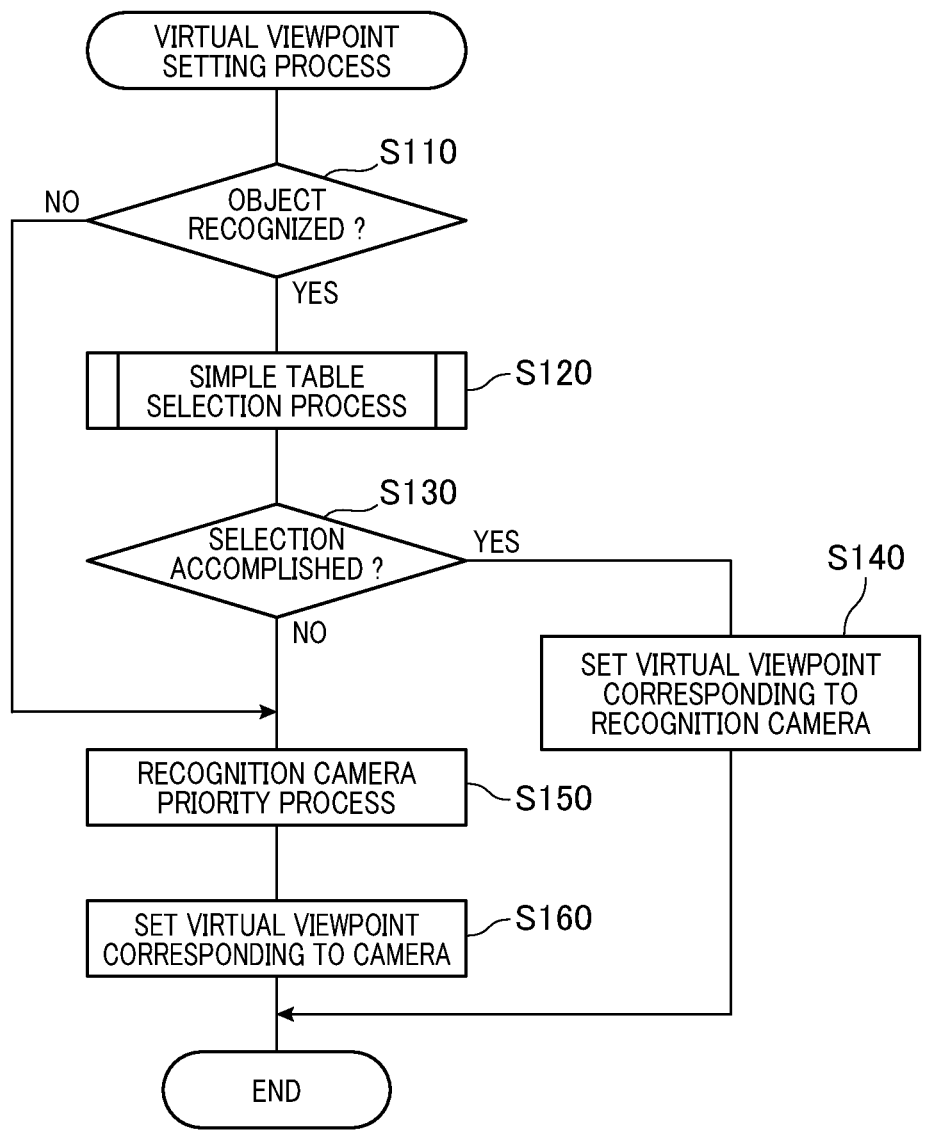
FIG. 7 is a flow chart showing a virtual viewpoint setting process of the embodiment.

Next a virtual viewpoint setting process executed by the CPU 12 in order to actualize a partial function of the viewpoint conversion unit 22 is described using a flowchart shown in FIG. 7. It is to be understood that the process is repeatedly performed at a predetermined timing for each function inside the display control unit 20, during a period in which a switch (not shown) of the display control apparatus 1 mounted in a vehicle is switched on.

Once the process starts, firstly, at the viewpoint conversion unit 22, captured images from all of the cameras 10 are input, and determination of whether a captured image has an object is performed by the image recognition unit step S110. The determination is performed, for example, based on whether identification information is stored in the memory 14. If it is determined that a captured image which includes an object in the image exists (among the captured images), the process proceeds to step S120, and if it is determined that such an image does not exist, the process proceeds to step S150.

At step S120, a process of selecting either the basic correspondence table or the supplementary correspondence table used to set the virtual viewpoint is performed (the process is referred to as a simplified table selection process hereon) and the process proceeds to step S130. It is noted that the recognition camera is also specified when either the basic correspondence table or the supplementary correspondence table is selected at the simplified table selection process. The simplified table selection process will be described in detailed hereinafter.

At step S130, it is determined whether selection of either the basic correspondence table or the supplementary correspondence table has been performed at step S120. The selection mentioned here of which is performed using the simplified table selection process. At step S130, if it is determined that either one of the correspondence tables are selected, the process proceeds to step S140, in contrast if neither of the correspondence tables are selected the process proceeds to step S150.

At step S140, the virtual viewpoint is set using the correspondence table selected at step S120 by the simplified table selection process, and the process is completed. It is noted that in the first embodiment, the virtual viewpoint is set as a predetermined angle from a position obliquely above the recognition camera on opposed-side thereof, and obliquely towards a lower part of the recognition camera-side.

In contrast, at step S150, a camera having the highest priority level (referred to as 'priority camera' hereon) is selected by a method, which is different from the simplified table process of step S120. A process which specifies the selected priority camera as the recognition camera (referred to hereon as 'a recognition camera priority process') is performed, and the process proceeds to step S160. Specifically, a priority camera is selected using a different method for each reason the recognized camera could not be recognized.

That is, in the present embodiment, in a case of determining that no object exists in the images at step S110, for example, one to two cameras are selected as priority cameras. It is noted that, a driving direction of the host vehicle is specified based on vehicle information transmitted through the in-vehicle LAN from other ECUs, for example. In a another example, if the number of recognition cameras are 3 or more, or if there are two recognition cameras and imaging region conditions described hereinafter are not satisfied, a priority camera 10 such as described below is selected as the priority camera. That is, the priority camera in this case is the camera 10 which captures an image having the highest number of objects, the camera 10 which captures images including an object in an imaging region corresponding to the driving direction of the host vehicle, and the camera 10 which is adjacent to two of three cameras 10 having a captured image with an object included in the image, for example. The priority camera is specified on the basis of the identification information and the image position information stored in the memory 14.

At step S160, either one of the corresponding tables, among the basic correspondence table and the supplementary correspondence table is selected, according to the priority camera specified at step S150 by the recognition camera priority process. Thereafter, the virtual viewpoint is set using the selected correspondence table and the process ends. That is, in the first embodiment, since the specified priority camera is the recognition camera, a virtual viewpoint is set as the predetermined angle from a position obliquely above the recognition camera on an opposed-side thereof, and obliquely towards a lower part of the recognition camera-side.

[Simplified Table Selection Process]

Figure 8:
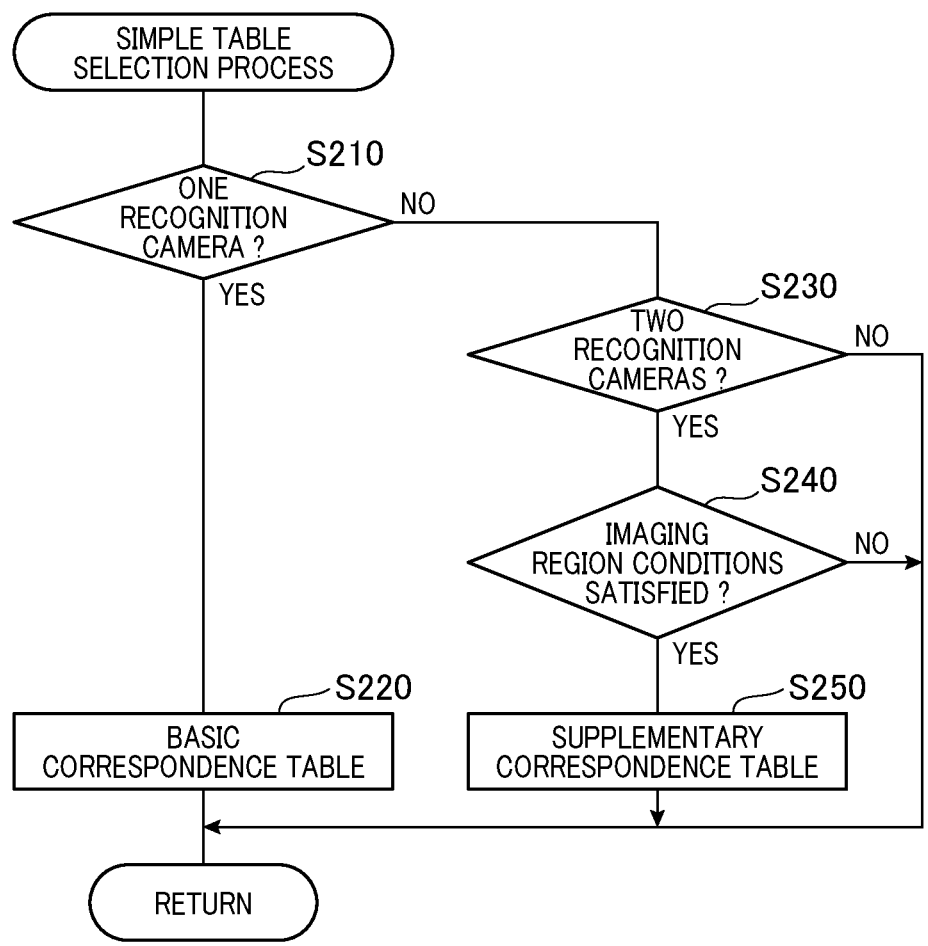
FIG. 8 is a flowchart showing a simplified table selection process according to the embodiment.

Next, the simplified table process executed by the CPU12 in step S120 is described using the flow chart shown in FIG. 8.

At step S210, once the process is initiated, firstly, the recognition camera is specified at the viewpoint conversion unit 22 based on the identification information stored in memory 14, and it is determined whether the specified camera is only one camera or more than one camera. If one recognition camera is determined, the process proceeds to step S220, the basic correspondence table is selected and the process ends. In contrast, if the recognition camera is determined as not being only 1 camera, (in the first embodiment the recognition camera is two or more), the process proceeds to step S230 and it is determined whether the number of specified cameras are 2 cameras. Furthermore, if the number of specified cameras is determined as two cameras, the process proceeds to step S240, however when the specified camera is determined as 3 or more cameras, the process ends.

An imaged region, which includes an object recognized by the image recognition unit 21, is an object-imaged region. At step S240, it is determined whether predetermined image region conditions of the object-imaged region are satisfied. If it is determined that the imaging region conditions are satisfied, the process proceeds to step S250, the supplementary correspondence table is selected and the process ends. If it is determined that the imaging region conditions are not satisfied, the process ends without selection of a correspondence table. Specifically, in the first embodiment, the object-imaged region is specified based on the image position information stored in the memory 14.

For example, one of the overlapping regions among the overlapping regions OA1 to OA4 may be an object-imaged region condition. That is, if an object recognized by the image recognition unit 21 exists in one of the overlapping regions OA1 to OA4 even in a case of two recognition cameras being specified, a virtual viewpoint which corresponding to the two recognition cameras combined may be set. This may be performed by selection of the supplementary table since both recognition cameras capture the object.

In another example, two of the single regions SA1 to SA4 both adjacent to one of the overlapping regions OA1 to OA4, may be also satisfy an imaging region condition. That is, if two or more objects are recognized to be distributed in two of the single regions SA1 to SA4, sandwiched between one of the overlapping regions OA1 to OA4, which are different imaging regions, a virtual viewpoint corresponding to two of the cameras combined may be set.

It is noted that the imaging region conditions are not limited to the exemplary embodiment, and a plurality of conditions may be predetermined.

[Blend Ratio Setting Process]

Figure 9:
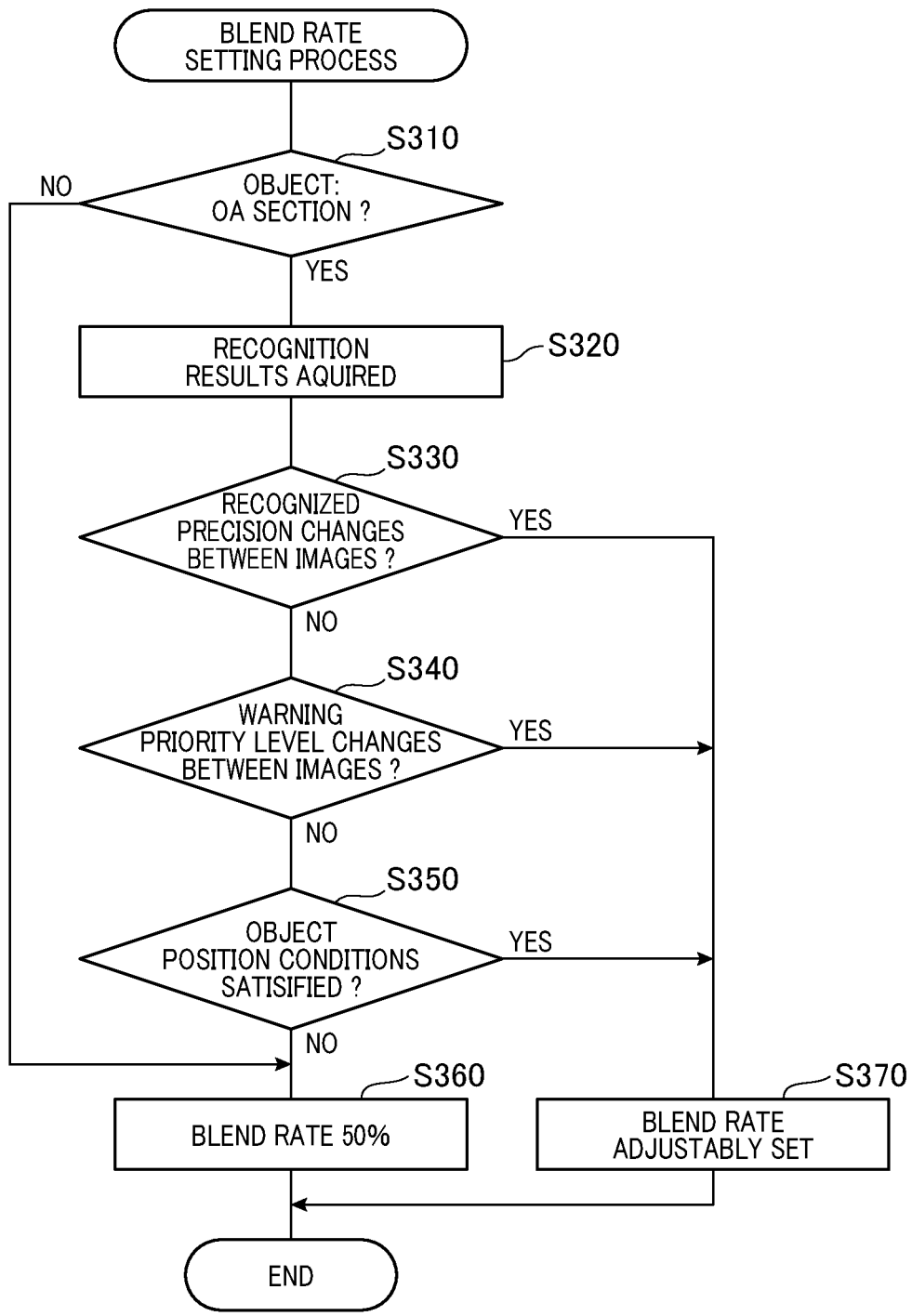
FIG. 9 is a flowchart exemplifying a blend ratio setting process according to the embodiment.

Next, a virtual viewpoint setting process performed by the CPU12 to actualize the function of the image-setting unit 24 will be described with reference to the flow chart shown in FIG. 9. It is noted that the process, for example, may be repeatedly initiated at predetermined timings for every function of the display control unit 20, during a time in which a switch of the display control apparatus 1 is switched on.

Once the process starts, firstly at step S310, it is determined whether the object recognized by the image recognition unit 21 exists in one of the overlapping regions OA1 to OA4, at the image-setting unit 24. The determination may be performed on the basis of the image position information stored in the memory 14, for example. When it is determined that an object exists in one of the overlapping areas OA1 to OA4, the procedure proceeds to step S320.

In contrast, when it is determined that an object does not exist on the overlapping regions OA1 to OA4, the process proceeds to step S360, an initial setting of 50% blend ratio is continually set for each viewpoint converted image area for the entire overlapping image regions and the process ends. The blend ratio is a synthesizing percentage of a pixel value (for example, RGB value) of each viewpoint converted image area in the overlapped imaging regions. As a result, if the blend ratio is set at 50% for each viewpoint converted image, and each viewpoint converted image area is given as the respective image area B1 and image area C1 before synthesizing the overlapping image regions, an image area B2 of each pixel value configuring the image area B1 multiplied by 50% and an image area C2 of each pixel value configuring the image area C1 multiplied by 50% are respectively added.

At step S320, the recognition results of an object determined to exist are acquired, and the process proceeds to step S330. Specifically, in the present embodiment, the recognition results of an object may be obtained by reading a candidate value and optical flow vector value, for example, related to the an object stored in the memory 14.

At step S330, a region which is determined at step S310 to have an object existing among the overlapping regions OA1 to OA4 is defined as an object overlapping region. A recognition precision of an object in each captured image of the two cameras 10, which captures images in these regions are compared. Specifically, the recognition precision of an object in each of the object overlapping regions, captured by the two cameras 10 is compared. At step S330, it is determined whether the recognition precision of an object is different in both captured images. Specifically, in the present embodiment, it may be determined that an object with a larger candidate value has a higher recognition precision, among the recognition result acquired at step S320.

It is noted that step S320 is a recognition results acquiring means which acquires the recognition result functionally using a process executed using the CPU 12.

In this way, if it is determined that the recognition precision of objects between each captured image is varying, the procedure proceeds to step S370. At step S370, the blend ratio of the overlapping image region in which an object is distributed is adjustably set, and the process ends. Specifically, the of a viewpoint converted image area based on a captured image having a the highest recognition precision is set higher than the blend ratio of other viewpoint converted image areas, among the viewpoint converted images in the overlapping regions. For example, in the present embodiment, the higher the recognition precision is the larger the blend ratio may be set, according to the recognition precision of each object in both captured images areas.

That is, in the settings described, it is necessary to set the blend ratio so that the blend ratios of both captured images when added together is 100%. For example, the image area B2 having each pixel value which configures the image area B1 multiplied by 70%, and the image area C2 having each pixel value which configures the image area C1 multiplied by 30% can be added together. In this case, the image area B1 is the imaging area which has the highest recognition precision, and the image area C1 is the imaging area which has the lowest recognition precision, among each viewpoint converted image area in the overlapping areas.

In contrast, when it is determined that the recognition precision of an object is not different between each of the captured images, the procedure proceeds to step S340. At step S340, a warning priority level of an object is compared in each captured image of the two cameras 10 which capture these regions, and it is determined whether the warning priority level of the objects in both images are different, for each object overlapping region. Specifically, in the present embodiment, it may be determined that, the higher the optical flow value related to an object is the higher the warning priority level is, among the recognized results acquired at step S320. It is noted that, comparison of the warning priority levels is not limited to the method described above. That is, the warning priority level may be determined, for example, by an object type in the image and other indicators.

The step S340 described above is a warning priority level determination means which determines the priority level of an object by function of a process executed by the CPU12.

In this manner, even when it is determined that the warning priority level of an object between images is different, the procedure proceeds to step S370, the blend ratio of the overlapping image region area in which the object is positioned in the image is adjusted and the process ends. Specifically, the of the viewpoint converted image area is set higher than the of other viewpoint converted images, based on an captured image which has the highest warning priority level among the each of the viewpoint converted images in the overlapping image regions. For example, in the present embodiment, the higher the warning priority level is the higher the blend ratio may be set, in accordance to each warning priority level of an object in both captured image areas.

In contrast, when it is determined that the warning priority level of an object between each captured image is not different, the process proceeds to step S350 and the image position of the object is compared between each captured image area of the two cameras 10 designated to imaging regions of the captured images. At step S350, it is determined whether one of the captured image areas, among the two captured image areas, satisfies the predetermined object position conditions, related to the position of the object. Specifically, in the present embodiment, for the position of the object in the image, a distance from a center of image is compared, based on the image position information stored in the memory 14. For example, it may be determined that the distance is smaller than a predetermined threshold, as a requirement to fulfill the object position conditions.

The object position conditions are not limited to the examples described above, that is, conditions related to an actual position of an object and a position of an object in the image may also be prescribed.

Implementation of conditions, which can directly determine the position of the object base on a position in the image, can decrease the load of performing a process.

In this manner, even when the existence of a captured image area which satisfies the object position condition is determined, among each of the captured images, the process proceeds to step S370, and the blend ratio of the overlapping image region areas in which the object is positioned is adjustably set and the process ends. Specifically, a viewpoint converted image area that is based on an image having satisfied object position conditions is set to have a higher blend ratio than the other viewpoint converted image areas, among each of the viewpoint converted images of the overlapping image regions. For example, in the first embodiment, the shorter the distance of the object from the center of each captured image is, the higher the blend ratio may be set, according to the image position of the object in both captured images.

When it is determined that captured image areas which satisfy the object position condition does not exist between each of the captured images, the procedure continues to step S360, the initial setting in which the blend ratio (%) of each viewpoint converted image is set to 50% is continued for all of the overlapping image regions, and the process ends.

In this manner, the blend ratio of each viewpoint converted image area of the overlapping image region is set according to the recognition precision, the warning priority level, and the object position conditions in the process described above. FIG. 10 shows a situation in which a pedestrian is captured as the object by the rear camera 4 and the right-side camera 6. That is, FIG. 10 shows a situation in which the rear camera 4 (refer to FIG. 10 (A)) has a higher recognition precision of both captured images, than the right-side camera 6 (FIG. 10B)). With reference to FIG. 10 (B), in this example, if the blend ratio (%) is set to 50% for each viewpoint converted image area of the overlapping image regions, the driving support images easily deteriorates visually, as the pedestrian is synthesized and shown at the same blend ratio (%) in both viewpoint converted images. In contrast, if the blend ratio is set to 70% for the rear camera 4, which has high recognition precision, and set to 30% for the right-side camera 6, which has low recognition precision, the visual deterioration of the driving support image is suppressed, as the image with the high recognition precision is synthesized so that the pedestrian stands out in the image (refer to FIG. 10(D)).

[Effect]

The following effects may be obtained from the first embodiment. It is noted that, the viewpoint converted image and the viewpoint converted image area will be respectively referred to as a converted image and a converted image area, for simplicity.

Each converted image area in an overlapping image region is synthesized by partial overlapping to join each converted image area. Furthermore, as each converted image area is synthesized with a set blend ratio based on the recognition results of an object, enhancement of the joined section is omitted, and an object may be clearly presented in the overlapping image region area which includes the joined section. As a further result, unnatural appearance, such as distortion of the joined sections may be resolved by synthesizing the overlapping image region areas of each converted image, and distortion of the visibility of an object in the overlapping image region areas may be decreased.

In the blend ratio setting process, among each of the converted image areas in the overlapping image regions, the blend ratio of a converted image is set to be higher than a blend ratio of other converted image areas, based on a captured image with the highest recognition precision of an object. As a result, an object with the highest warning priority level may be displayed to stand out, in the driving support image.

Also in the blend ratio setting process, among each of the converted image areas in the overlapping image regions, the blend ratio of a converted image area is set to be higher than the blend ratio of other converted image areas, based on a captured image including an object with the highest warning priority. As a result, the driving support image may be provided so that an object which has the highest warning priority may be presented to stand out in the driving support image.

The blend ratio (%) of the converted image area is set higher than the blend ratio of other converted image areas, for a captured image in which the predetermined object position conditions are satisfied, among each converted image area in the overlapping image regions. In this case, the predetermined object conditions specifically relate a position of the object. As a further result, the driving support image may be presented so that an object which has the highest possibility of being completely captured is provided to visually stand out in an image.

[Other Embodiments]

A preferred embodiment of the present disclosure has been described herein above, however the present disclosure is not limited to the preferred embodiment and other various modes may be adapted.

In the preferred embodiment, the captured images of each camera 10 synthesized viewpoint converted images with converted viewpoints, and the synthesized images are output as the driving support image, however the driving support image is not limited to the above-described process. For example, at least one captured image from each camera 10 may be converted to a viewpoint converted image and output as the driving support image.

A configuring element of the preferred embodiment having a plurality of functions may be actualized by a plurality of elements, and a plurality of configuring elements provided with one function may be unified into one element. Some of the configuring elements of the preferred embodiment may be omitted, and at least some of the configuring elements of the preferred embodiment may be added to the other embodiments or substituted by a different element. It is to be understood that all modes included in the technical idea specified by the scope of the claims are the embodiments of the present disclosure.

In addition to the display control apparatus 1 installed in a vehicle, a system configuring the display control apparatus 1, one or more programs to configure a computer to function as the display control apparatus 1, one or more recording medias (specifically, a non-transitory recording media, for example, a semiconductor memory), and a display controlling method, for example, according to the present disclosure, may be actualized by a variety of modes.

SYMBOLS

1 . . . display control apparatus installed in a vehicle
2 . . . front camera
4 . . . rear camera 6 . . . right-side camera
8 . . . left-side camera
10 . . . camera
12 . . . CPU
14 . . . memory
20 . . . display control unit
21 . . . image recognition unit
22 . . . viewpoint conversion unit
23 . . . image synthesis unit
24 . . . image-setting unit
25 . . . image enhancing unit
26 . . . image-outputting unit
30 . . . display
A1 . . . front region
A2 . . . rear region
A3 . . . right-side region
A4 . . . left-side region
E1 to E8 . . . virtual viewpoints
OA1 . . . front right-side overlapping region
OA2 . . . front left-side overlapping region
OA3 . . . rear right-side overlapping region
OA4 . . . rear left-side overlapping region
SA1 . . . front single region
SA2 . . . rear single region
SA3 . . . right-side single region
SA4 . . . left-side single region

What is claimed is:

1. A display control apparatus mounted in a vehicle, the apparatus comprising:
a plurality of imaging devices provided on the vehicle to capture a preset plurality of imaging regions, which overlap in part and surround the vehicle, by dividing the imaging regions among the respective imaging devices;
an image recognition unit configured to recognize a predetermined object in images captured by of each of the plurality of imaging devices;
an image synthesis unit configured to synthesize an image to a converted image viewed from a virtual viewpoint, which is preset for each image captured by two imaging devices among the plurality of imaging devices, in response to the imaging regions, which include the object recognized by the image recognition unit, being overlapping imaging regions in which both of two imaging devices captures images;
an image-setting unit configured to set a blend ratio of each converted image area in the overlapping image regions based on a recognition result of the object recognized by the image recognition unit, and
an image-outputting unit configured to output the synthesized image as a driving support image to a display mounted in a vehicle, the synthesized image being synthesized from each converted image area in the overlapping image regions, using the image synthesis unit, and the blend ratio of the each converted image being preset by the image-setting unit, wherein,
the image synthesis unit is configured to synthesize each converted image area in the overlapping image regions of two converted images overlapping, using a preset blend ratio, to generate a synthesized image by overlapping to join each converted image, and
the image-setting unit is configured to set the blend ratio of a converted image area higher than the blend ratio of other conversion image areas, for a captured image in which predetermined object position conditions which relate to an object position are satisfied, wherein among each converted image area in the overlapping image regions, a distance of the object position from a center of each captured image of the two imaging devices are compared, and wherein the shorter the distance of the object from the center of the image, the higher the blend ratio of the image is set, based on the blend ratio of the converted image being set higher than the blend ratio of other conversion image areas.

2. The display control apparatus according to claim 1, wherein,
the image-setting unit is provided with:
a setting means for setting the blend ratio of a converted image area higher than the blend ratio of other converted image areas, for a captured image which has a highest recognition precision of the object, among each converted image area in the overlapping image regions.

3. The display control apparatus according to claim 1, wherein,
the image-setting unit is provided with a warning priority level determination means for determining whether the warning priority level changes between images, and
a setting means for setting the blend ratio of a converted image area higher than the blend ratio of other converted image areas, for a captured image which has a highest warning priority level of the object, among each converted image area in the overlapping areas.

4. The display control apparatus according to claim 2, wherein,
the image-setting unit is provided with a warning priority level determination means for determining whether the warning priority level changes between images, and
the first setting means for setting the blend ratio of a converted image area higher than the blend ratio of other converted image areas, for a captured image which has a highest warning priority level of the object, among each converted image area in the overlapping areas.

5. A display control method for a vehicle, the method comprising:
an image recognition step for recognizing predetermined objects in captured images captured by a plurality of imaging devices mounted on the vehicle for capturing each imaging region which overlap in part and surround the vehicle;
an image synthesis step for synthesizing an image to a converted image viewed from a virtual viewpoint, which is preset for each image captured by two imaging devices among the plurality of imaging devices, based on the imaging regions, which include the object recognized by the image recognition unit, being overlapping imaging regions in which both of two imaging devices captures images;
an image setting step for setting a blend ratio of each converted image area in the overlapping image regions based on a recognition result of the object recognized by the image recognition unit, and
an image outputting step for outputting the synthesized image as a driving support image to a display mounted in a vehicle, the synthesized image being synthesized using each converted image area in the overlapping image regions at the image synthesis step and the blend ratio of the each converted image being set by the image setting step, wherein,
the image synthesis step synthesizes each converted image area in the overlapping image regions of two converted images overlapping, using a preset blend ratio, to generate a synthesized image by overlapping to join each converted image, and the image-setting step is performed to set the blend ratio of a converted image area higher than the blend ratio of other conversion image areas, the blend ratio being set for a captured image in which predetermined object position conditions which relate to an object position are satisfied, wherein among each converted image area in the overlapping image regions, a distance of the object position from a center of each captured image of the two imaging devices are compared, and wherein the shorter the distance of the object from the center of the image, the higher the blend ratio of the image is set, based on the blend ratio of the converted image being set higher than the blend ratio of other conversion image areas.

6. A processing device, the processing device comprising:

an image recognition unit configured to recognize predetermined objects in captured images captured by a plurality of imaging devices mounted on a vehicle for imaging a plurality of predetermined imaging areas, which overlap in part and surround the vehicle, by dividing the imaging regions among the imaging devices;

an image synthesis unit configured to synthesize an image to a converted image viewed from a virtual viewpoint, which is preset for each image captured by two imaging devices among the plurality of imaging devices, based on the imaging regions, which include the object recognized by the image recognition unit, being overlapping imaging regions in which both of two imaging devices captures images;

an image-setting unit configured to set a blend ratio of each converted image area in the overlapping image regions based on a recognition result of the object recognized by the image recognition unit, and an image-outputting unit configured to output the synthesized image as a driving support image to a display mounted in a vehicle, the synthesized image being synthesized from each converted image area in the overlapping image regions, using the image synthesis unit, and the blend ratio of the each converted image being preset by the image-setting unit, wherein, the image synthesis unit synthesizes each converted image area in the overlapping image regions of two converted images overlapping, using a preset blend ratio, to generate a synthesized image by overlapping to join each converted image, and the image-setting unit is configured to set the blend ratio of a converted image area higher than the blend ratio of other conversion image areas, for a captured image in which predetermined object position conditions which relate to an object position are satisfied, wherein among each converted image area in the overlapping image regions, a distance of the object position from a center of each captured image of the two imaging devices are compared, and wherein the shorter the distance of the object from the center of the image, the higher the blend ratio of the image is set, based on the blend ratio of the converted image being set higher than the blend ratio of other conversion image areas.

7. The processing device according to claim 6, wherein, the image-setting unit is provided with a setting means for setting the blend ratio of a converted image area higher than the blend ratio of other converted areas for an image having a highest recognition precision of the object, among each of the converted image areas in the overlapping image regions, the highest recognition precision of the object being recognized by the recognition result acquiring means.

8. The processing device according to claim 6, wherein;

the image-setting unit is provided with a warning priority level determination means for determining whether the warning priority level between images changes, and the setting means for setting the blend ratio of a converted image area higher than the blend ratio of other converted areas for a captured image determined, by the warning priority level determination means, to have a highest warning priority level of the object among the each converted image in the overlapping regions.

9. The processing device according to claim 7, wherein;

the image-setting unit is provided with a warning priority level determination means for determining whether the warning priority level between images changes, and the first setting means for setting the blend ratio of a converted image area higher than the blend ratio of other converted areas for a captured image which is determined to have a highest warning priority level of the object, determined by the warning priority level determination means, among the each converted image in the overlapping regions.

10. A recording medium in which digital program data is stored, the program data being readable by a CPU, the CPU reading the program data from the recoding medium and executing the read program data so as to enable the CPU to function as:

an imaging recognition unit which recognizes predetermined objects in captured images captured by a plurality of imaging devices mounted on a vehicle, the plurality of imaging devices capturing a plurality of imaging regions by dividing the imaging regions among the imaging devices, the plurality of imaging regions overlapping in part and surrounding the vehicle;

an image synthesis unit which synthesizes an image to a converted image viewed from a virtual viewpoint which is preset, for each image captured by two imaging devices among the plurality of imaging devices, based on the imaging regions, which include the object recognized by the image recognition unit, being overlapping imaging regions in which both of two imaging devices captures images;

an image-setting unit which sets a blend ratio of each converted image area in the overlapping image regions based on a recognition result of the object recognized by the image recognition unit, and an image-outputting unit which outputs the synthesized image as a driving support image to a display mounted in a vehicle, the synthesized image being synthesized by each converted image area in the overlapping image regions, using the image synthesis unit, and the blend ratio of the each converted image being preset by the image-setting unit, wherein, the image synthesis unit synthesizes each converted image area in the overlapping image regions of two converted images overlapping, using a preset blend ratio, to generate a synthesized image by overlapping to join each converted image, and the image-setting unit is configured to set the blend ratio of a converted image area higher than the blend ratio of other conversion image areas, for a captured image in which predetermined object position conditions which relate to an object position are satisfied, wherein among each converted image area in the overlapping image regions, a distance of the object position from a center of each captured image of the two imaging devices being compared, and wherein the shorter the distance of the object from the center of the image, the higher the blend ratio of the image is set, based on the blend ratio of the converted image being set higher than the blend ratio of other conversion image areas.

11. A display control apparatus mounted in a vehicle, the apparatus comprising:

a plurality of imaging devices provided on the vehicle to capture a preset plurality of imaging regions, which overlap in part and surround the vehicle, by dividing the imaging regions among imaging devices, and a control unit comprising a processor and configured to:
  recognize a predetermined object in images captured by each of the plurality of imaging devices;
  synthesize an image to a converted image viewed from a virtual viewpoint, which is preset for each image captured by two imaging devices among the plurality of imaging devices, based on the imaging regions, which include the object recognized, being overlapping imaging regions in which both of the two imaging devices captures images;
  set a blend ratio of each converted image area in the overlapping image regions based on a recognition result of the object, and
  output the synthesized image as a driving support image to a display mounted in a vehicle, the synthesized image being synthesized from each converted image area in the overlapping image regions, and the blend ratio of the each converted image being preset, wherein, the control unit synthesizes each converted image area in the overlapping image regions of two converted images overlapping, using a preset blend ratio, to generate a synthesized image by overlapping to join each converted image, and the control unit sets the blend ratio of a converted image area higher than the blend ratio of other conversion image areas, for a captured image in which predetermined object position conditions which relate to an object position are satisfied, wherein among each converted image area in the overlapping image regions, a distance of the object position from a center of each captured image of the two imaging devices is compared, and wherein the shorter the distance of the object from the center of the image, the higher the blend ratio of the image is set, based on the blend ratio of the converted image being set higher than the blend ratio of other conversion image areas.

* * * * *